United States Patent [19]

Geissmann

[11] 4,270,444
[45] Jun. 2, 1981

[54] SPIT ROASTER

[76] Inventor: Robert Geissmann, 153 Rue de l'Universite, 75007 Paris, France

[21] Appl. No.: 940,085

[22] Filed: Sep. 6, 1978

[51] Int. Cl.³ .............................................. A47J 37/04
[52] U.S. Cl. .................................. 99/421 V; 99/421 P
[58] Field of Search .................. 99/421, 404, 419, 420; 126/25 R, 41 A

[56] References Cited

U.S. PATENT DOCUMENTS

| | | | |
|---|---|---|---|
| 1,755,646 | 4/1930 | Halstead | 99/419 |
| 2,198,134 | 4/1940 | Spiegl | 99/421 HV X |
| 2,549,019 | 4/1951 | Saunders | 99/421 P |
| 2,565,786 | 8/1951 | Spartalis | 99/421 P |
| 3,221,638 | 12/1965 | Wickenberg | 99/421 P X |
| 3,309,982 | 3/1967 | Surks | 126/25 R X |
| 3,483,816 | 12/1969 | Lombardi | 99/421 R |
| 3,543,671 | 12/1970 | Pendzimas et al. | 99/404 X |
| 3,604,341 | 9/1971 | Coroneos | 99/421 V |
| 3,744,403 | 7/1973 | Castronuovo | 99/421 V |
| 3,848,523 | 11/1974 | Galisz et al. | 126/25 X |

FOREIGN PATENT DOCUMENTS

| | | | |
|---|---|---|---|
| 2515658 | 10/1976 | Fed. Rep. of Germany | 99/421 V |
| 2641126 | 3/1978 | Fed. Rep. of Germany | 99/421 R |
| 6501636 | 2/1965 | Netherlands | 99/421 HH |
| 359523 | 2/1962 | Switzerland | 99/421 HH |
| 167283 | 8/1921 | United Kingdom | 126/41 A |

Primary Examiner—Harvey C. Hornsby
Assistant Examiner—Arthur O. Henderson

[57] ABSTRACT

A spit roaster includes a ventilating caged-like housing within which there is positioned a horizontal rotatable table. An electric motor is located below the table and is adapted to rotate the same. A conical member is carried centrally of the table and tapers upwardly and inwardly. A plurality of bars extend upwardly from the table to constitute a peripherally extending grid and to define a depository for a source of heat. A plurality of spits are rotatable individually by respective electric motors and are also rotatable together with the table. Such spits are adjustably positioned relative to the hearth such that they can be individually spaced from the hearth at a desired distance. The spits can also be adjustable in terms of their inclination relative to the hearth. The caged-like housing is apertured and provided with a dome or hood of double-wall or simple-wall construction and with a chimney so as to facilitate the aspiration of outside air through the spit roaster in order to remove accumulated fumes by means of the chimney.

9 Claims, 5 Drawing Figures

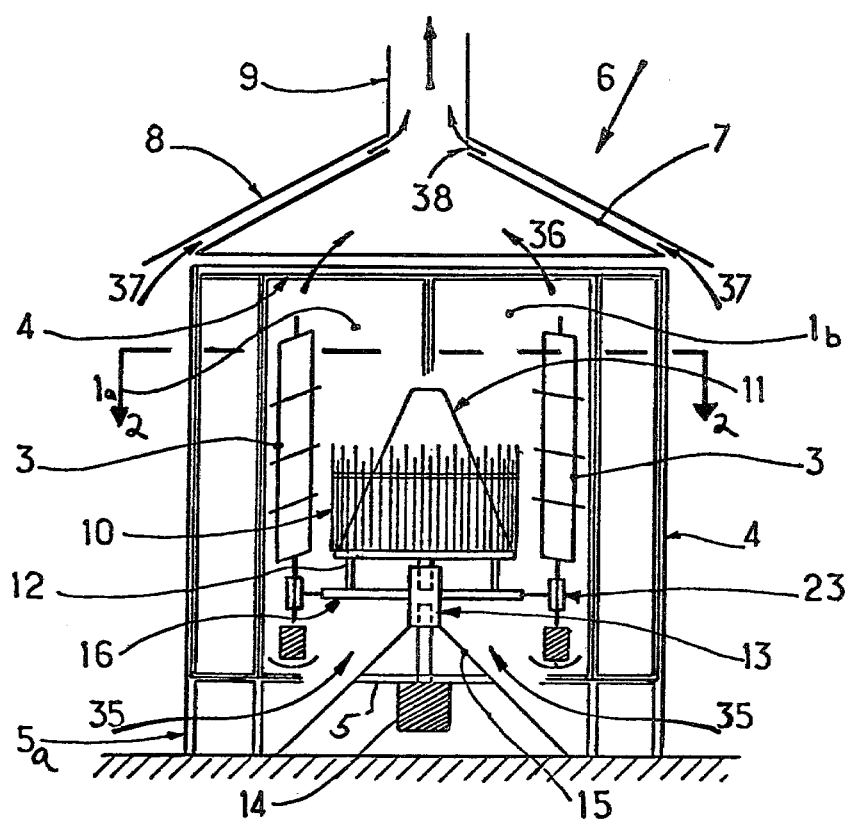
FIG:1
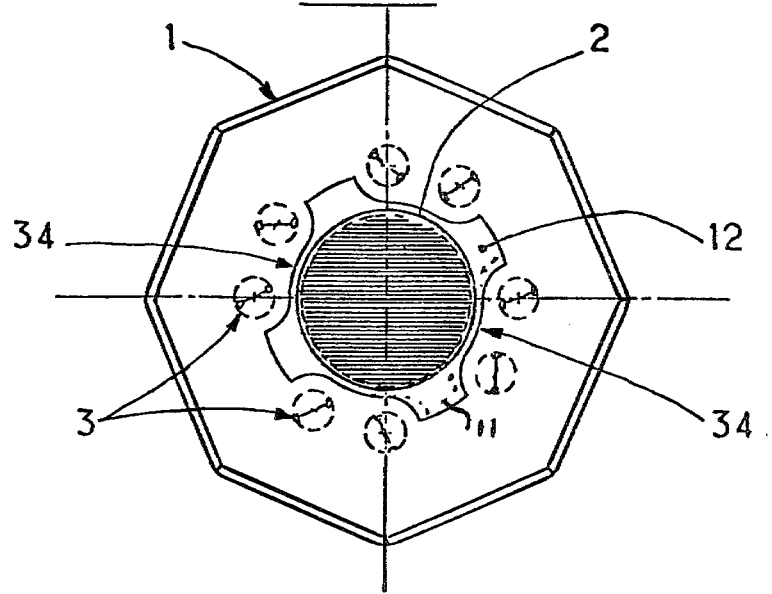
FIG:2

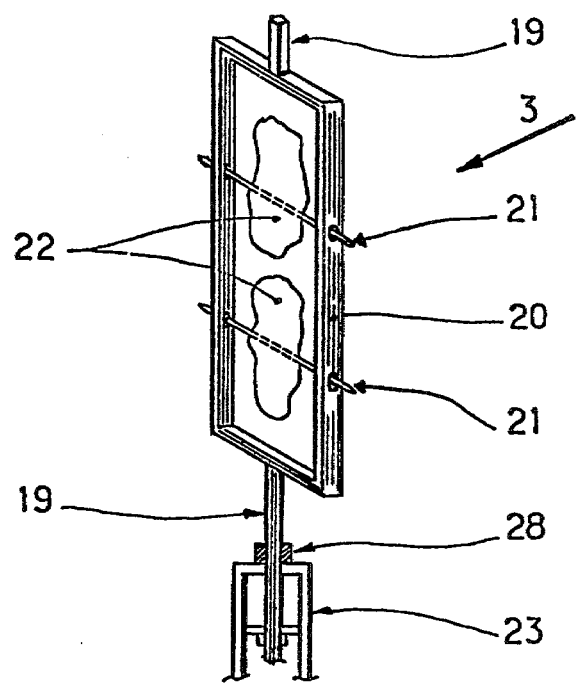
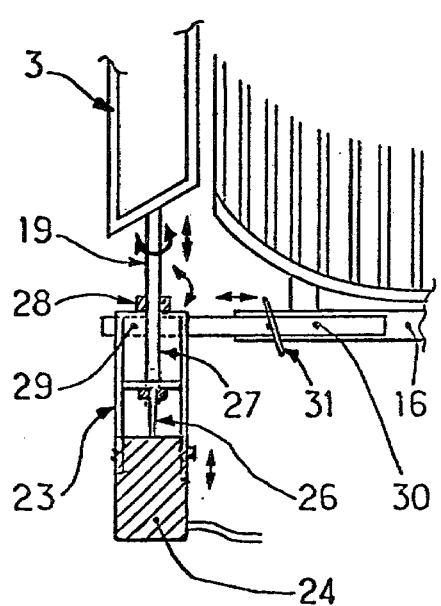
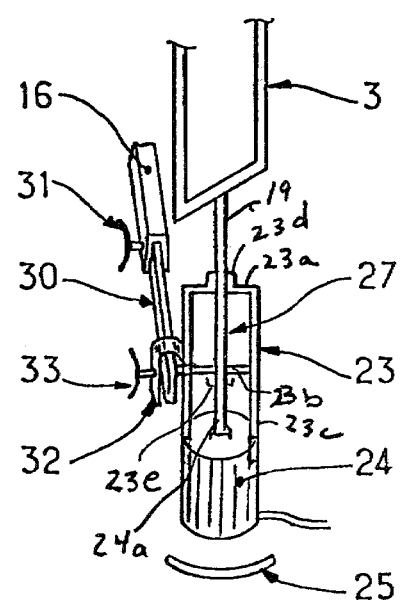

SPIT ROASTER

BACKGROUND OF THE INVENTION

The present invention relates to rotisserie-type devices intended for the spit roasting of various types of foods such, for example, as chicken and meat. The invention relates more particularly to an improved spit roaster of the type which includes a plurality of vertically extending and individually rotatable spits.

Devices for the roasting, grilling or cooking of meat have been described in the literature and have also been marketed in the form of barbecues or rotatable spits. With a view to the cooking of large pieces of meat, even a complete animal, devices have been employed wich incorporate multiple vertical spits which are capable of individual rotation at selective distances from a central hearth. Such devices, however, have certain deficiencies, partially because of the inability of the spits to rotate as a unitary assembly, partially because of the impossibility of spit adjustment in terms of inclination and/or spacing relative to the hearth, and partially due to the poor circulation of air within the device and the lack of suitable provision for evacuation of the accumulated air fumes.

In an attempt to remedy the foregoing drawbacks, applicant designed a spit roaster for the simultaneous cooking of multiple pieces of meat on a set of vertical spits rotatable about a central hearth. Such spit roaster comprises a cage having transparent panels, a central hearth disposed above rotatable horizontal plate and a plurality of spits, each of which can be adjusted in terms of its inclination relative to the hearth, each of such spits being rotatable by means of its own motor. The improved spit roaster is described in French Pat. No. 2,231,343. Nevertheless, even this patent has certain of the drawbacks mentioned above.

According to the present invention a spit roaster is provided in which a plurality of spits are mounted relative to a central hearth, such that the spits are individually rotatable and are rotatable as an assembly together with the hearth. The spits are mounted so as to be spaced a desired distance from the hearth and at selected inclinations relative to the hearth.

The present invention further provides for efficient ventilation of the spit roaster so as to eliminate the accumulation of fumes and odors.

According to the present invention individually rotatable spits are arranged about a central hearth, the coupling between each spit and its motor being so constructed as to prevent the imposition of heavy weights upon the motor shaft so as to obviate the possibility of warping of such shaft.

A further object of the invention is the provision of a spit roaster which includes a plurality of individually rotatable spits arranged about a rotatable central hearth, the construction being such that programmed rotation of the hearth and spit assembly can easily be accommodated.

Full details of the present invention are set forth in the following description.

BRIEF DESCRIPTION OF THE DRAWINGS

In order that the invention may be more fully comprehended it will now be described, by way of example, with reference to the accompanying drawings in which:

FIG. 1 is a front elevation of a spit roaster embodying the features of the invention, FIG. 2 is a top plan view of the spit roaster shown in FIG. 1 taken along line II—II thereof, FIG. 3, is a perspective view of a spit constructed in accordance with the invention, FIG. 4 is a fragmentary elevational view of a spit carried in a mounting stirrup by the table, and FIG. 5 is a fragmentary view, in perspective, showing the spit, its mounting stirrup and individual motor and the construction whereby the spit can be articulated.

DESCRIPTION OF THE PREFERRED EMBODIMENTS

Referring to the drawings there is shown a spit roaster which includes a cage-like housing 1 comprising a series of connected transparent panels, preferably formed of glass or vitreous material so as to be resistant to thermo shock. The housing is desirably apertured so as to facilitate ventilation of the spit roaster to obviate the accumulation of fumes and odors therein, as will become clear. Within housing 1 there is positioned a central hearth 2 about which a plurality of individually rotatable spits or skewers 3 are mounted so as to be rotatable also concomitantly with the hearth. Adjacent panels of the housing 1 desirably open in the fashion of double door 1a and 1b, to provide access to the spits and hearth. The cage-housing comprises an arrangement of frame members 4 which extend horizontally and vertically and which may terminate in a lattice base 5 standing on legs 5a adapted to rest upon a supporting surface for the spit roaster. The housing is surmounted by a dome or hood 6 of double-wall or simple-wall construction as shown by walls 7, 8 which converge upwardly into chimney 9. Between the double-walls of the dome structure one or more channels are formed which are in communication with the chimney to permit the flow of outside air as indicated by arrows 37. The double-wall dome and channels 37 provides a plurality of holes 38 on the bottom of the vertical chimney which like nozzles provide a venturi suction effect for the movement of the ambient air.

Central hearth 2 is constituted by a circular or polygonal grid 10 formed by a plurality of upwardly extending bars or rods supported on a horizontally disposed plate 12. A conical funnel member 11 can be removably positioned upon the table formed by plate 12 within the circular grid 10, so as to define therebetween a depository for fuel such as wood. The plate 12 is desirably given a central dependending hub shaft by means of which it may be mounted in a keyed coupling sleeve 13 so as to thereby be driveably connected to an electric motor 14 preferably of the variable dash-speed type. A conical base member 15 is positioned beneath the table and such base conveniently supports motor 14. Sleeve 13 is rotatably mounted on bae 15 and may be carried detachably relative to the base.

A plurality of arms 16 project radially from sleeve 13 and may for additional support be attached to the plate 12 by vertical members. Each of such arms is supportive of a spit 3, which as seen in FIGS. 3, 4 and 5 comprises a rectangular frame 20 provided at each of the opposed ends thereof with mounting shafts 19 which project longitudinally from such ends into a mounting stirrup 23 supported on the arm 16. Intermediate the ends of the rectangular frame, the sides of the frame 20 are provided with a plurality of opposed pairs of holes in which are insertable pin members 21. It will be appreciated, of course, that the number of holes or pin members is not critical and can be more or less than the two depicted. The food pieces 22 to be cooked by the spit roaster are supported by skewering the pin members through the holes and the food. It will be recognized that due to the coaxial mounting of shaft 19 on the opposed ends of the spit frame the spit is reversible so as to be mounted by either end in the mounting stirrup 23.

The stirrup 23 comprises a cylindrical frame, having an upper generally closed end 23a, a central transverse wall 23b and a plurality of longitudinal arms 23c which extend about or within the housing of the motor 24 so that it may be secured to the motor. A central coupling shaft 27 is journalled along the central axis of the cylindrical frameforming the stirrup 23 and is held in place by coupling members 23d and 23e. The drive shaft 24a of the motor is inserted within the lower end of the coupling shaft 27 while the shaft 19 of the spit 3 is insertable in the upper end of the shaft 3. Both shafts 24a and 19 may be secured to the coupling 27 by cooperating key means or by set screws, wing nuts or the like.

It will be observed from this construction that heavy loads are centered along the axis of the motor shaft 27 preventing bending or warping of the shaft.

As can be seen most clearly from FIGS. 4 and 5 each of radially extending arms 16 is formed as a hollow channel member. Positioned slideably within eac of the hollow channel members arm 16 is a rod member 30. A clamping element 31 such as a wing nut is provided for securing the rod member 30 in the desired extended relationship to arm 16. A traverse shaft 29 is slideably carried by each rod member 30 adjacent its outer end. The shaft 29 is secured by an adjustale bolting or the like to one of the longitudinal arms 23a. A bent steel strip 32, capable of functioning as a leaf spring, is carried by shaft 29 and is cooperable with a wing nut 33 to clamp the rod 30 against the longitudinal arm 23a of the stirrup. In this manner the stirrup may be selectively articulated with respect to the rod member 30 so that the spit inclinded relative to the hearth at a desired angle relative radially to the central axis defined by the axis of rotation and tangentially to the peripheral of the central hearth. In addition, the stirrups 23 may be raised or lowered with respect to the rod members 30. Note the arrows in FIG. 4. Each motor is carried by the stirrup adjacent one end thereof, the wires of which may be drawn to the central post where they may be connected to the source of power serving motor 14 by conventional means, such as a commutator. The connection of the motor shaft 24a, coupling sleeve 27 and mounting shaft 19 enables the individual driving rotation of each spit by its associated motor about an axis vertical with the central axis of hearth rotation or at any selected angle thereto. A drip pan 25 is located beneath each motor and is desirably carried by the stirrup through removable hangers, and serves for the collection of dirt, oil, food drippings and the like.

Referring to FIG. 2 of the drawings it will be seen that in the preferred configuration the table formed by plate 12 is generally circular but also it can be provided with a series of recesses 34 which are suitably shaped similar to an octagon and is dimensioned to receive pairs of spits 3, so as to permit the close positioning of such pairs of spits relative to the hearth. When so positioned within the recesses the food material carried by such spits is subjected to increased heat radiation from the hearth.

It will be appreciated that sleeve 13 which mounts radial arms 16 supportive of the spit stirrups accommodate the upper portion of the drive shaft of motor 14 can be either stationary such that the motor drive shaft rotates within a bearing or, alternatively, the sleeve may rotate in which case the shaft for motor 14 may be integral with the sleeve.

It will be understood, of course, that although the plate 12 has been depicted as being octagonal and provided with recesses for the accommodation of eight spits, the configuration of the table as well as the number of spits may be varied as desired. Further, the overall size of the spit roaster can be selected in accordance with the type of use intended, for example, the spit roaster can be larger and heavier construction containing an increased number of spits when intended for institutional use. On the contrary, when the spit roaster is intended for domestic use it can be constructed of lighter materials and a smaller number of spits may be provided.

As stated previously, ventilation of the spit roaster of this invention is enhanced whether or not the cage-like housing is employed. When the housing 1 is utilized, aspiration of outside air may take place in three zones, i.e., through the bottom of the device as indicated by arrows 35; through the dome or hood following the path of arrows 36; and between the double-walls of the dome structure as shown by arrows 37. The latter ventilationpath minimizes the possibility of accidental blow back of fumes into the housing by virtue of the provision of perforations 38 at the juncture of walls 7, 8 of the dome structure. The provision of the aforesaid ventilation system thus facilitates removal of fumes and odors which would normally escape through the joints of the panels of housing 1, thereby avoiding the staining and splashing of such panels. Such ventilation of the spit roaster also avoids blow back of fumes and odors into the ambient atmosphere of a room in which the spit roaster may be located when doors 1a, 1b are open for access for the interior of the spit roaster.

It will be understood, of course, that when desired the housing 1 may be modified omitting the side panels and doors so as to provide merely a support for the dome structure thereby enabling free access to the splits and hearth such as may be desirable when the spit roaster is to be employed out-of-doors.

The central motor 14 and the spit motor 24 are preferebly electric motors of variable speed. As a result each may be provided with appropriate means whereby rotation of the table 12 and spits 3 can be programmed individually and/or in common in a predetermined manner. The central motor 14 thus rotates the central hearth 2 (plate 10 and grid 10 in which the coals are situated) and the spits about the axis of sleeve 13, while the motors 24 rotate the spits 3 about the axes formed by the shaft 9. It is possible to replace the sleeve 13 with a planatary gear transmission whereby the arms 16 can be made to rotate independent of the hearth 2 thereby simultaneously causing the spits to revolve about the axis of the hearth rather than conjointly rotatate with it.

Preferably the source of heat is a wood burning fire, charcoal, coals or other combustible can be used. It is also possible to construct the conical funnel member as an electrical heating unit provided with heating coils or the like.

From the foregoing description it will be seen that a spit roaster has been provided whereby each of the spits are rotatable individually as well as concomitantly relative to each other and to the rotation of the central hearth. The rotational speed of the spits individually and of the unitary assembly of the spits and hearth can each be regulated so as to secure the desired cooking rate for each of the food pieces carried by the spits. Adjustment of the angle of inclination of each spit relative to the hearth also enables greater control over the cooking process.

A further feature of this invention, in providing the hearth construction desribed above, enables the use of a grid 10 of any desired height. Thus, by providing a grid of increased height a coal bed of corresponding greater depth can be obtained and radiation from the hearth is correspondingly increased thereby resulting in an appreciable saving in ultimate fuel consumption.

It is possible, and within the contemplation of the invention, to utilize the spit roaster upon a fixed partition such as a wall. In such event, the external shape of the device can be hemispherical or otherwise as may be convenient. When employed in this form the central motor for driving of the hearth and spit assembly may be omitted and only the spits would be individually rotatable.

What is claimed:

1. A spit roaster comprising a horizontally disposed table, mounted for rotation about a first axis, a body member mounted centrally on said table, and a grid mounted along the periphery of said table to define with said body member an area for location of a source of heat, a sleeve mounted for rotation about said central axis, conjointly with said table, a plurality of radially extending hollow arms projecting from said sleeve, a rod member slidably positioned in each of said arms and selectively securable in any desired extended relation radial therewith, a spit rotatably mounted on the free end of each of said rods for rotation about a second axis spaced from said first axis and rotatable conjointly with said table about said first axis, first motor means to rotate said table and spits about said first axis, and second motor means to rotate said spits about said second axis, a stirrup carried by each of said rods, a coupling sleeve secured to each said stirrup extending longitudinally thereof, and an electric motor mounted at one end of each said stirrup having a motor shaft thereof insertable into one end of the coupling sleeve, the other end of each said coupling sleeve being adapted to receive one of the mounting shafts of the spit for operative connection with the motor.

2. A spit roaster according to claim 1, wherein each said spit comprises a rectangular frame, a mounting shaft extending from each of the opposed ends of the frame and at least one pin carried by and extending transversely of said frame.

3. A spit roaster according to claim 2 including a plurality of said pins carried by said frame in parallel spaced relationship.

4. A spit roaster according to claim 1, including a shaft secured to each said rod, said stirrups being carried for articulation by said shafts, and means comprising a leaf spring and wing nut being provided in association with each of the shafts for securing the stirrup in selected articulated relationship relative to its corresponding rod thereby positioning the spit in desired angular relationship with respect to the hearth.

5. A spit roaster according to claim 1 including a drip pan carried by each said stirrup beneath the electric motor for collection of dirt, oil and the like.

6. A spit roaster according to claim 1, wherein said table is generally circular and is provided with a series of recesses dimensioned to receive pairs of said spits to thereby permit close positioning of said pairs of spits relative to said hearth.

7. A spit roaster according to claim 1, wherein said grid comprises a plurality of vertical bars mounted peripherally about said table and extending upwardly therefrom.

8. A spit roaster according to claim 1, including a cage-like housing enclosing said hearth and spits, said housing including transparent panels and access doors to provide access to said spits, said housing further including a dome and chimney surmounting said panels, said dome being formed by a double wall construction providing channels which are in communication with said chimney, openings being provided in said housing in the lower portion thereof whereby outside air is aspirated through the spit roaster for removal of accumulated fumes therein through said chimney.

9. A spit roaster according to claim 1, wherein said body is a conical member removably carried by said table.

* * * * *